US009247574B2

(12) United States Patent
Wang et al.

(10) Patent No.: US 9,247,574 B2
(45) Date of Patent: Jan. 26, 2016

(54) COMMUNICATION IMPLEMENTATION METHOD, VIRTUAL MACHINE PROGRAM PRODUCT, MODEM AND TERMINAL

(75) Inventors: Yonghui Wang, Beijing (CN); Chuan Yu, Beijing (CN); Wei Jiao, Beijing (CN)

(73) Assignee: CHINA MOBILE COMMUNICATIONS CORPORATION, Beijing (CN)

( * ) Notice: Subject to any disclaimer, the term of this patent is extended or adjusted under 35 U.S.C. 154(b) by 0 days.

(21) Appl. No.: 14/235,244

(22) PCT Filed: Jul. 27, 2012

(86) PCT No.: PCT/CN2012/079276
§ 371 (c)(1),
(2), (4) Date: Jan. 27, 2014

(87) PCT Pub. No.: WO2013/013641
PCT Pub. Date: Jan. 31, 2013

(65) Prior Publication Data
US 2014/0169337 A1 Jun. 19, 2014

(30) Foreign Application Priority Data

Jul. 27, 2011 (CN) .......................... 2011 1 0212023

(51) Int. Cl.
*H04L 12/28* (2006.01)
*H04W 76/02* (2009.01)
(Continued)

(52) U.S. Cl.
CPC ............ *H04W 76/026* (2013.01); *H04W 12/06* (2013.01); *H04W 16/14* (2013.01); *H04W 72/02* (2013.01); *H04W 88/06* (2013.01)

(58) Field of Classification Search
CPC .... H04W 72/02; H04W 76/026; H04W 12/06
USPC .......... 370/335, 336, 252, 329, 442, 386, 419
See application file for complete search history.

(56) References Cited

U.S. PATENT DOCUMENTS

2006/0018470 A1  1/2006 Paila et al.
2008/0026724 A1* 1/2008 Zhang ........................... 455/411
(Continued)

FOREIGN PATENT DOCUMENTS

CN         1889385 A    1/2007
CN       101154167 A    4/2008
(Continued)

OTHER PUBLICATIONS

International Search Report (in Chinese with English translation) for PCT/CN2012/079276, mailed Nov. 8, 2012; ISA/CN.

*Primary Examiner* — John Pezzlo
(74) *Attorney, Agent, or Firm* — Harness, Dickey & Pierce, P.L.C.

(57) ABSTRACT

A method for implementing communication includes: determining an operating system corresponding to a current time slice, the determined operating system supporting a communication network standard; determining a memory partition; running the determined operating system based on the determined memory partition and driving a Digital Signal Processor, a signal processing module supporting the communication network standard and a Radio Frequency signal transceiver based on a hardware driving program included in a system program of the determined operating system; controlling the signal processing module to read authentication information of the terminal and controlling the Digital Signal Processor to encapsulate, based on a communication protocol, the authentication information of the terminal to generate a communication network signal; and controlling the Radio Frequency signal transceiver to convert the communication network signal into a Radio Frequency signal and send the Radio Frequency signal to a communication network.

13 Claims, 5 Drawing Sheets

(51) Int. Cl.
*H04W 12/06* (2009.01)
*H04W 72/02* (2009.01)
*H04W 16/14* (2009.01)
*H04J 1/16* (2006.01)
*H04W 88/06* (2009.01)

(56) References Cited

U.S. PATENT DOCUMENTS

| | | | | |
|---|---|---|---|---|
| 2008/0263348 | A1* | 10/2008 | Zaltsman | G06F 8/63 713/2 |
| 2009/0170473 | A1* | 7/2009 | Bauernfeind et al. | 455/411 |
| 2010/0135275 | A1* | 6/2010 | Storm et al. | 370/349 |
| 2011/0211036 | A1* | 9/2011 | Tran | H04N 5/23229 348/14.08 |
| 2012/0108205 | A1* | 5/2012 | Schell et al. | 455/411 |
| 2012/0182938 | A1* | 7/2012 | Mujtaba et al. | 370/328 |
| 2012/0269161 | A1* | 10/2012 | Chin et al. | 370/330 |

FOREIGN PATENT DOCUMENTS

| | | |
|---|---|---|
| CN | 101350981 A | 1/2009 |
| KR | 20010069084 A | 7/2001 |

\* cited by examiner

… (1)

COMMUNICATION IMPLEMENTATION METHOD, VIRTUAL MACHINE PROGRAM PRODUCT, MODEM AND TERMINAL

The present application is the national phase of International Application No. PCT/CN2012/079276, titled "COMMUNICATION IMPLEMENTATION METHOD, CENTRAL PROCESSING UNIT AND TERMINAL", filed on Jul. 27, 2012, which claims the priority to Chinese Patent Application No. 201110212023.5, entitled "COMMUNICATION IMPLEMENTATION METHOD, CENTRAL PROCESSING UNIT AND TERMINAL," filed on Jul. 27, 2011 with State Intellectual Property Office of People's Republic of China, which applications are incorporated herein by reference in their entirety.

TECHNICAL FIELD

The present invention relates to communication technologies, and in particular, to a method for implementing communication, a central processing unit and a terminal.

BACKGROUND

With continuous development of communication technologies, users put forward higher requirements for data bandwidth and signal quality of a mobile communication network. In an era developing from 2G network to 3G network and LTE network, mobile communication operators should study on convergence and multiplexing of different communication networks to offer the users reliable and high quality services.

In order to flexibly achieve the convergence and multiplexing of different communication networks in a user terminal, a common solution is to integrate in the user terminal several signal processing modules respectively supporting different communication network standards; hence, the user terminal may be connected to a communication network based on an actual situation. As shown in FIG. 1, two signal processing modules are integrated in a Modem supporting multiple standards in the user terminal, one is a signal processing module supporting a communication network standard of Global System for Mobile Communications (GSM), while the other is a signal processing module supporting a communication network standard of Time Division-Synchronous Code Division Multiple Access (TD-SCDMA). In addition, the Modem shown in FIG. 1 further includes a Central Processing Unit (CPU) and a Digital Signal Processor (DSP).

With the user terminal shown in FIG. 1, when it is required to run a Real Time Operating System (RTOS) supporting any communication network standard in the user terminal so as to establish connection between the user terminal and the communication network, since the user terminal merely includes one set of hardware resources (the CPU and the DSP shown in FIG. 1 and other hardware resources such as a memory, etc., which are not shown in FIG. 1) for running one RTOS, only one RTOS may be run in the user terminal and accordingly the user terminal may merely be connected to one communication network.

SUMMARY

A method for implementing communication, a CPU and a terminal are provided according to embodiments of the disclosure, to resolve the problem in the prior art that a user terminal may merely run one RTOS based on one set of hardware resources and consequently the user terminal may merely be connected to one communication network.

A technical solution according to the embodiments of the disclosure is described as follows.

A method for implementing communication is provided in the disclosure. The method includes:

determining, based on preset correspondences between respective time slices and operating systems supporting different communication network standards, an operating system corresponding to a current time slice, where the determined operating system supports a communication network standard; determining, based on preset correspondences between the operating systems supporting the different communication network standards and memory partitions in a memory of a terminal, a memory partition corresponding to the determined operating system; running the determined operating system based on the determined memory partition and driving a corresponding DSP, a corresponding signal processing module supporting a communication network standard and a corresponding Radio Frequency signal transceiver based on a hardware driving program included in a system program of the determined operating system, where the signal processing module supports the communication network standard supported by the determined operating system; controlling the signal processing module to read authentication information of the terminal and controlling the Digital Signal Processor to perform, based on a communication protocol corresponding to the communication network standard, encapsulation on the authentication information of the terminal to generate a communication network signal; and controlling the Radio Frequency signal transceiver to convert the communication network signal into a Radio Frequency signal and send the Radio Frequency signal to the communication network.

Optionally, the operating systems supporting the different communication network standards include:

an operating system supporting a communication network standard of GSM and an operating system supporting a communication network standard of TD-SCDMA.

Optionally, the method further includes: driving a corresponding data buffer based on the hardware driving program; after controlling the Radio Frequency signal transceiver to convert the communication network signal into the Radio Frequency signal and send the Radio Frequency signal to the communication network, the method further includes: determining, based on preset correspondences between the operating systems supporting the different communication network standards and storage space partitions in a storage space of the data buffer, a storage space partition corresponding to the determined operating system; and storing the signal interacted between the terminal and the communication network in the determined storage space partition.

Optionally, the method further includes: driving a corresponding power amplifier based on the hardware driving program; where the controlling the Radio Frequency signal transceiver to convert the communication network signal into the Radio Frequency signal and send the Radio Frequency signal to the communication network includes: controlling the Radio Frequency signal transceiver to convert the communication network signal into the Radio Frequency signal and send the Radio Frequency signal to the power amplifier, and controlling the power amplifier to amplify the Radio Frequency signal and send the amplified signal to the communication network.

A CPU is provided in the disclosure. The CPU includes: an operating system determination unit, configured to determine, based on preset correspondences between respective time slices and operating systems supporting different communication network standards, an operating system corresponding to a current time slice, where the determined operating system supports a communication network standard; a memory partition determination unit, configured to determine, based on preset correspondences between the operating systems supporting the different communication network standards and memory partitions in a memory of a terminal, a memory partition corresponding to the determined operating system; a hardware driving unit, configured to run the determined operating system based on the determined memory partition and drive a corresponding DSP, a corresponding signal processing module supporting a communication network standard and a corresponding Radio Frequency signal transceiver based on a hardware driving program included in a system program of the determined operating system, where the signal processing module supports the communication network standard supported by the determined operating system; a communication network signal generation control unit, configured to, after the hardware driving unit drives the DSP, the signal processing module and the Radio Frequency signal transceiver, control signal processing module to read authentication information of the terminal including the CPU and control the DSP to perform encapsulation, based on a communication protocol corresponding to the communication network standard, on the authentication information of the terminal to obtain a communication network signal; and a communication network signal transmission control unit, configured to control the Radio Frequency signal transceiver to convert the communication network signal into a Radio Frequency signal and send the Radio Frequency signal to the communication network.

A terminal is provided in the disclosure. The terminal includes a CPU, a DSP, a signal processing unit supporting a communication network standard and a Radio Frequency signal transceiver. The CPU is configured to determine, based on preset correspondences between respective time slices and operating systems supporting different communication network standards, an operating system corresponding to a current time slice, where the determined operating system supports a communication network standard; determine, based on preset correspondences between the operating systems supporting the different communication network standards and memory partitions in a memory of the terminal, a memory partition corresponding to the determined operating system; run the determined operating system based on the determined memory partition, drive the DSP, the signal processing module supporting the communication network standard and the Radio Frequency signal transceiver based on a hardware driving program included in a system program of the determined operating system, and control the DSP, the signal processing module supporting the communication network standard and the Radio Frequency signal transceiver.

The signal processing module supporting the communication network standard is configured to read, under control of the CPU, authentication information of the terminal.

The Digital Signal Processor is configured to, under control of the CPU, perform encapsulation, based on a communication protocol corresponding to the communication network standard, on the authentication information of the terminal to obtain a communication network signal.

The Radio Frequency signal transceiver is configured to, under control of the CPU, convert the communication network signal into a Radio Frequency signal and send the Radio Frequency signal to the communication network.

An advantage of the embodiments of the disclosure is described as follows:

with the technical solution according to the embodiments of the disclosure, the CPU of the terminal may run the operating systems supporting the different communication network standards in corresponding time slices based on the correspondences between the respective time slices and the operating systems supporting the different communication network standards, and the terminal is accordingly connected to corresponding communication networks; hence, the terminal may run a plurality of RTOSs based on one set of hardware resources and the terminal may be connected to a plurality of communication networks.

DETAILED DESCRIPTION OF EMBODIMENTS

To resolve the existing problem that a user terminal may merely run one RTOS based on one set of hardware resources and consequently the user terminal may merely connects to one communication network, a new solution for implementing communication is provided according to embodiments of the disclosure. In the solution, the hardware resources of the user terminal are simulated by using a Virtualization Machine Monitor (VMM), a plurality of RTOSs on a higher layer above the hardware resource may be respectively allocated with virtual hardware resources, and the plurality of RTOSs may be connected to communication networks with the virtual hardware resources allocated to the respective RTOSs.

The solution according to the embodiments of the disclosure is explained in detail hereinafter in conjunction with drawings.

Figure 1:
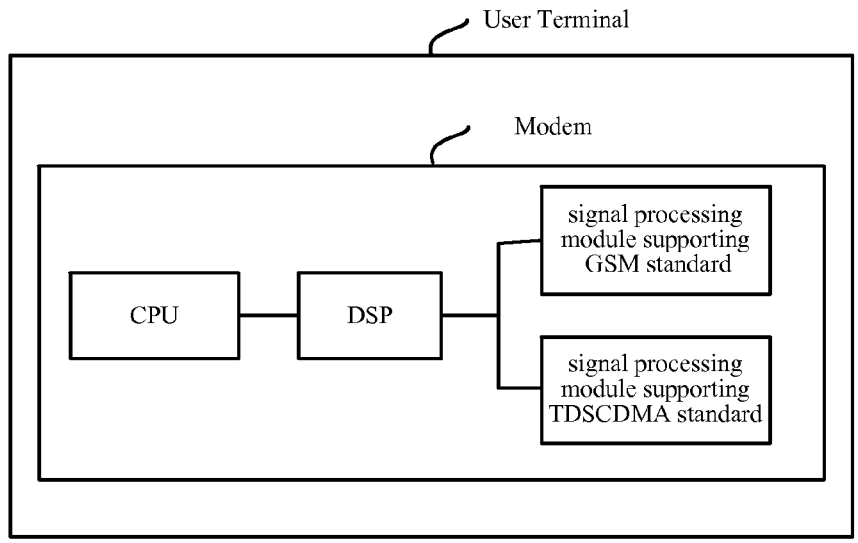
FIG. 1 is a schematic structure diagram of an existing user terminal.
Figure 2:
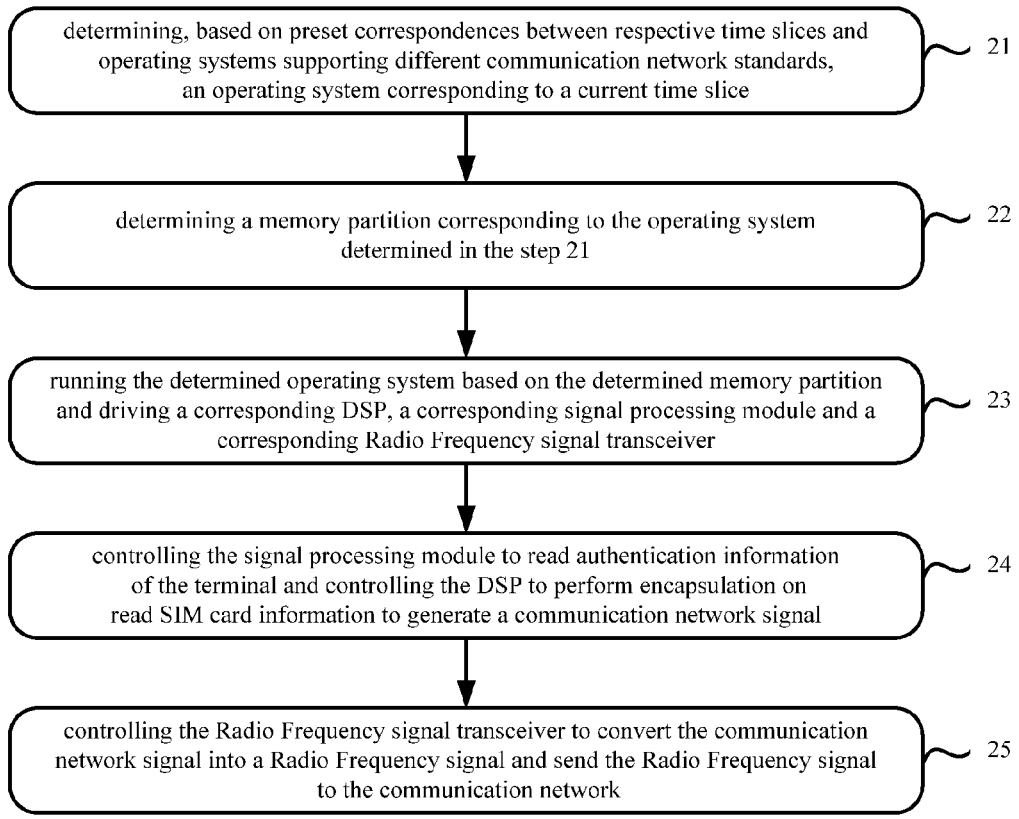
FIG. 2 is a schematic flow chart of a method for implementing communication according to an embodiment of the disclosure.

A method for implementing communication is provided according to an embodiment of the disclosure. FIG. 2 is a schematic flow chart of the method. The method includes steps 21-25.

The step 21 is to determine, based on preset correspondences between respective time slices and operating systems supporting different communication network standards, an operating system corresponding to a current time slice; where the operating system supports a communication network standard.

The time slices are periods of time during which a CPU is allocated to respective processes. Usually, each process is allocated with a period of time, called as the time slice for the process, i.e., time during which running of the process is permitted. If the process is still run when the time slice expires, the access to the CPU by the process is robbed and the CPU is allocated to another process; or if the process is blocked or terminated before the end of the time slice, the CPU is immediately switched to another process. According to the embodiment of the disclosure, time division multiplexing of the CPU in a terminal by the operating systems supporting different communication network standards is implemented by setting the correspondences between the respective time slices and the operating systems supporting different communication network standards.

According to the embodiment of the disclosure, the operating systems supporting different communication network standards may include, but not limited to, an operating system supporting a communication network standard of GSM and an operating system supporting a communication network standard of TD-SCDMA.

The step 22 is to determine, based on preset correspondences between the operating systems supporting different communication network standards and memory partitions in a memory of the terminal, a memory partition corresponding to the operating system determined in the step 21.

The step 23 is to run the determined operating system based on the determined memory partition and to drive a corresponding DSP, a corresponding signal processing module supporting a communication network standard and a corresponding Radio Frequency signal transceiver based on a hardware driving program included in a system program of the determined operating system. The signal processing module being driven meets the condition of supporting the communication network standard supported by the determined operating system.

In the step 24, the signal processing module is controlled to read authentication information of the terminal from a Subscriber Identity Module (SIM) card or a Universal Subscriber Identity Module (USIM) card, the DSP is controlled to perform, based on a communication protocol corresponding to the standard supported by the determined operating system, encapsulation on the read authentication information of the terminal to generate a communication network signal.

Since the encapsulation performed on the read authentication information of the terminal by the DSP based on the communication protocol is known in the art, implementation of the encapsulation is not described here.

In the step 25, the Radio Frequency signal transceiver is controlled to convert the communication network signal into a Radio Frequency signal and send the Radio Frequency signal to the communication network.

In the method according to the embodiment of the disclosure, the correspondences between the respective time slices and the operating systems supporting different communication network standards are preset, corresponding operating systems are run in different time slices, and accordingly, the terminal is connected to different communication networks. The terminal may run a plurality of RTOSs based on one set of hardware resources, and the terminal may be connected to a plurality of communication networks.

Optionally, the method for implementing communication according to the embodiment of the disclosure may further include: driving a corresponding data buffer based on the hardware driving program. After the data buffer is driven and after the communication network signal is converted into the Radio Frequency signal by the Radio Frequency signal transceiver and the Radio Frequency signal is sent to the communication network, a storage space partition corresponding to the determined operating system is further determined based on preset correspondences between the operating systems supporting different communication network standards and storage space partitions in a storage space of the data buffer. Then the signal interacted between the terminal and the communication network may be stored in the determined storage space partition of the data buffer, and accordingly, the operating systems supporting different communication network standards may share the space resource of the buffer.

Optionally, the method for implementing communication according to the embodiment of the disclosure may further include: driving a corresponding power amplifier based on the hardware driving program. In this step, after the power amplifier is driven, if it is required to control the Radio frequency signal transceiver to convert the communication network signal into the Radio Frequency signal and send the Radio Frequency signal to the communication network, firstly, the Radio Frequency signal transceiver may be controlled to convert the communication network signal into the Radio Frequency signal; then the Radio Frequency signal is sent to the power amplifier, and the power amplifier is controlled to perform amplification and send the amplified Radio Frequency signal to the communication network.

Figure 3:
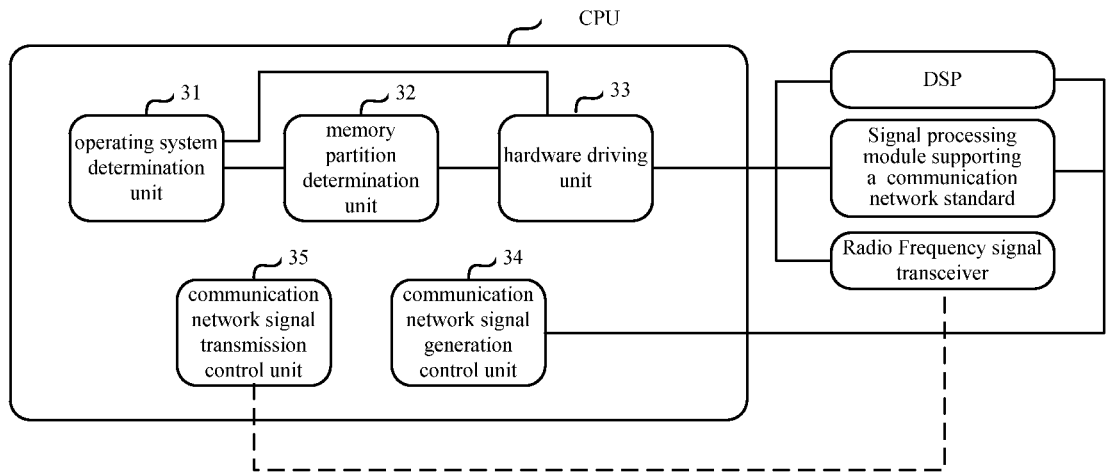
FIG. 3 is a schematic structure diagram of a CPU according to an embodiment of the disclosure.

Accordingly, to resolve the problem in the prior art that a user terminal may merely run one RTOS based on one set of hardware resources and consequently the user terminal may merely be connected to one communication network, a CPU is provided according to an embodiment of the disclosure. FIG. 3 is a schematic structure diagram of the CPU. The CPU includes:

an operating system determination unit 31, configured to determine, based on preset correspondences between respective time slices and operating systems supporting different communication network standards, an operating system corresponding to a current time slice; where the operating system supports a communication network standard;

a memory partition determination unit 32, configured to determine, based on preset correspondences between the operating systems supporting different communication network standards and memory partitions in a memory of a terminal, a memory partition corresponding to the operating system determined by the operating system determination unit 31;

a hardware driving unit 33, configured to run the operating system determined by the operating system determination unit 31 based on the memory partition determined by the memory partition determination unit 32 and drive a corresponding DSP, a corresponding signal processing module supporting a communication network standard and a corresponding Radio Frequency signal transceiver based on a hardware driving program included in a system program of the operating system determined by the operating system determination unit 31, where the signal processing module supports the communication network standard supported by the determined operating system;

a communication network signal generation control unit 34, configured to, after the hardware driving unit 33 drives the DSP, the signal processing module and the Radio Frequency signal transceiver, control the signal processing module to read authentication information of the terminal including the CPU, and control the DSP to perform, based on a communication protocol corresponding to the communication network standard, encapsulation on the read authentication information to generate a communication network signal; and a communication network signal transmission control unit 35, configured to control the Radio Frequency signal transceiver to convert the communication network signal generated by the communication network signal generation control unit 34 into a Radio Frequency signal, and control the Radio Frequency signal transceiver to send the Radio Frequency signal to the communication network.

The hardware driving unit 33 may further be configured to drive a corresponding data buffer based on the hardware driving program. Here the CPU shown in FIG. 3 further includes: a storage space partition determination unit, configured to, after the communication network signal transmission control unit controls the Radio Frequency signal transceiver to convert the communication network signal into the Radio Frequency signal and send the Radio Frequency signal to the communication network, determine, based on preset correspondences between the operating systems supporting different communication network standards and storage space partitions in a storage space of the data buffer, a storage space partition corresponding to the determined operating system; and a storage unit, configured to store the signal interacted between the terminal and the communication network into the storage space partition determined by the storage space partition determination unit.

Optionally, the hardware driving unit 33 may further be configured to drive a corresponding power amplifier based on the hardware driving program. Here the communication network signal transmission control unit 35 may further include:

a first control module, configured to control the Radio Frequency signal transceiver to convert the communication network signal to the Radio Frequency signal and control the Radio Frequency signal transceiver to send the Radio Frequency signal to the power amplifier driven by the hardware driving unit; and a second control module, configured to control the power amplifier to amplify the Radio Frequency signal sent by the Radio Frequency signal transceiver under the control of the first control module and control the power amplifier to send the amplified Radio Frequency signal to the communication network.

An exemplary application of the foregoing solution according to the embodiments of the disclosure is described in detail hereinafter.

Figure 4:
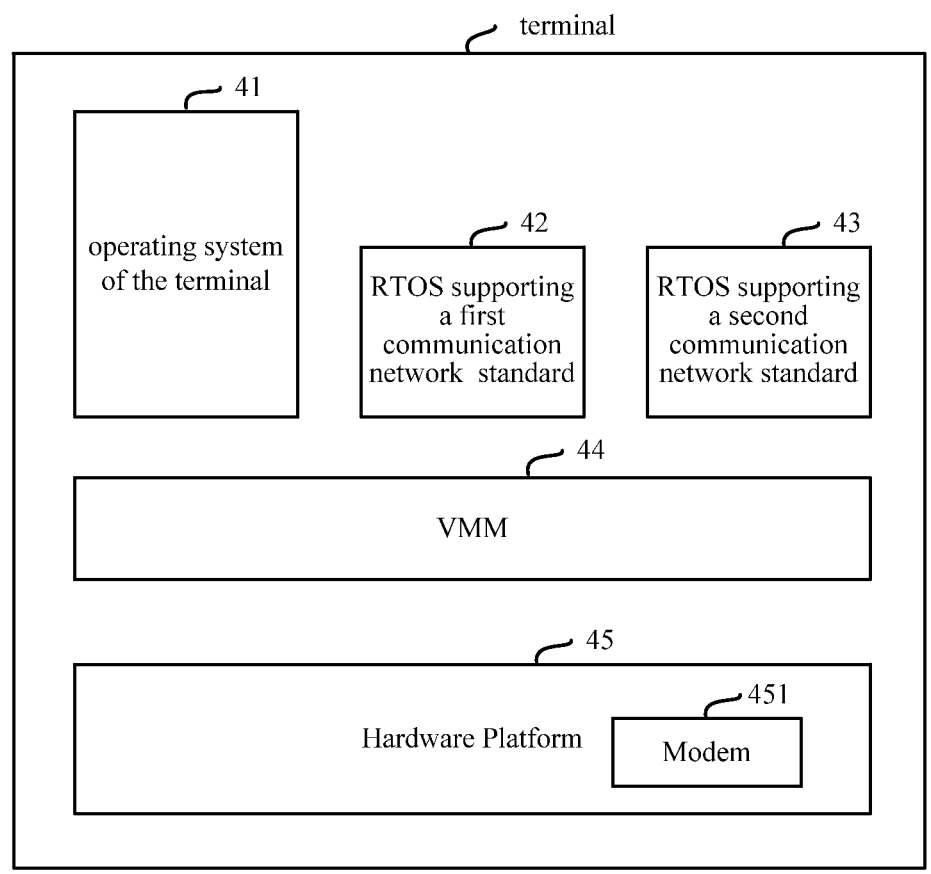
FIG. 4 is a schematic structure diagram of a terminal constructed with a technical solution according to embodiments of the disclosure.

A terminal including two RTOSs is taken as an example. The terminal constructed with the solution according to the embodiments of the disclosure is shown in FIG. 4. As shown in FIG. 4, the terminal mainly includes a terminal operating system 41, an RTOS 42 supporting a first communication network standard (called as RTOS 42 for short), an RTOS 43 supporting a second communication network standard (called as RTOS 43 for short), a Virtual Machine Manager (VMM) 44 and a Hardware Platform 45. The Hardware Platform includes a Modem 451 supporting a plurality of standards (called as Modem 451 in short).

The terminal operating system 41, the RTOS 42 supporting the first communication network standard, the RTOS 43 supporting the second communication network standard and the VMM 44 are all software modules, running of those software modules is based on a CPU in the Modem 451.

The VMM 44, run based on the CPU in the Modem 451, is configured to perform virtualization of hardware resources included in the Hardware Platform 45, The virtualization of hardware resources is to offer, through combination or division of the hardware resources, corresponding hardware resources for running the RTOS 42 and the RTOS 43, respectively. Furthermore, through the virtualization of the hardware resource, signal processing modules included in the Modem 451 supporting multiple standards may respectively read authentication information of the terminal from a same SIM card in the terminal, where the signal processing modules respectively support different communication network standards; authentications with different communication networks and connections to the different communication networks are implemented based on the read authentication information of the terminal; hence, the terminal is connected to multiple communication networks based on one SIM card.

Figure 5:
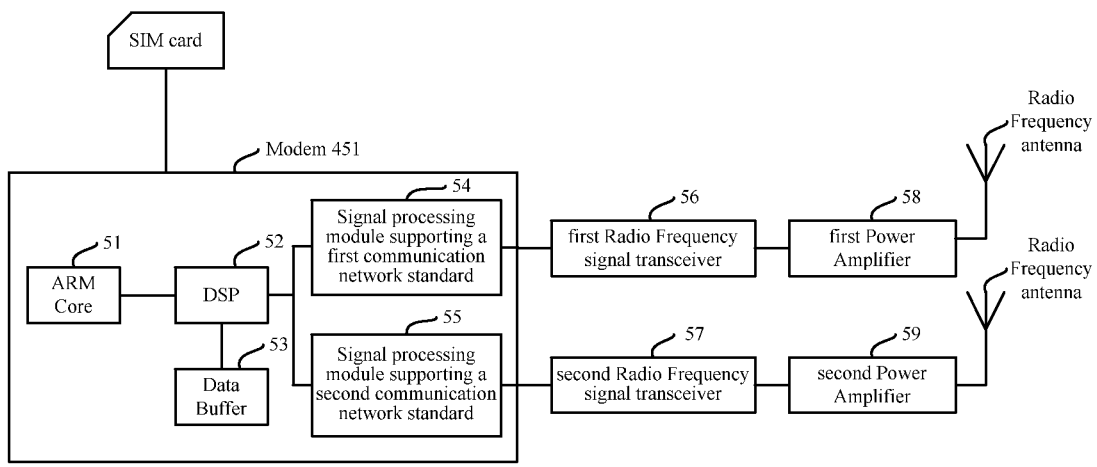
FIG. 5 is a schematic structure diagram of a Modem 451 in FIG. 4.

The Modem 451 is configured to run the operating system 41 of the terminal, the RTOS 42 and the RTOS 43, and control hardware modules to connect to different communication networks to implement signal interaction. A schematic structure diagram of the Modem 451 is shown in FIG. 5. The Modem 451 includes an ARM Core 51, a DSP 52, a Data Buffer 53, a signal processing module 54 supporting the first communication network standard and a signal processing module 55 supporting the second communication network standard. In addition, the Modem 451 is further connected in the peripheral with an SIM card, a first Radio Frequency signal transceiver 56 and a second Radio Frequency signal transceiver 57 configured to send and receive Radio Frequency signals, and a first Power Amplifier 58 and a second Power Amplifier 59 configured to amplify the power of the Radio Frequency signal. The forgoing components are described in detail as follows.

The ARM Core 51 is an ARM-based CPU.

The DSP 52 is configured to, under control of the ARM core 51, encapsulate data to be sent to the communication networks according to communication protocols corresponding to operating systems supporting different communication network standards; hence, corresponding communication network signals are generated. The DSP 52 is further configured to, under control of the ARM core 51, parse communication network signals sent from the communication networks to obtain corresponding data. Usually, there may be one or two DSPs 52 set in one Modem 451.

The Data Buffer 53 is configured to buffer the communication network signals interacted between the communication networks and the terminal.

The signal processing module 54 supporting the first communication network standard is configured to read the authentication information of the terminal from the SIM card, provide the authentication information of the terminal to the DSP 52 to perform encapsulation based on the first communication network standard, and obtain, under control of the ARM Core 51, a first communication network signal generated after the encapsulation performed by the DSP 52.

The signal processing module 55 supporting the second communication network standard is configured to read the authentication information of the terminal from the SIM card, provide the authentication information of the terminal to the DSP 52 to perform encapsulation based on the second communication network standard, and obtain, under control of the ARM Core 51, a second communication network signal generated after the encapsulation performed by the DSP 52.

The SIM card is configured to maintain the authentication information of the terminal, where the authentication information of the terminal is required in the authentication for connecting to the communication networks and the authentication information of the terminal includes International Mobile Equipment Identity (IMEI) information.

As shown in FIG. 5, the first Radio Frequency signal transceiver 56 is connected with the signal processing module 54 supporting the first communication network standard, to perform Radio Frequency signal interaction between the first Radio Frequency signal transceiver 56 and the first communication network; the second Radio Frequency signal transceiver 57 is connected with the signal processing module 55 supporting the second communication network standard, to perform Radio Frequency signal interaction between the second Radio Frequency signal transceiver 57 and the second communication network.

As shown in FIG. 5, the first Power Amplifier 58 is connected with the first Radio Frequency signal transceiver 56, to amplify the Radio Frequency interacted between the first Radio Frequency signal transceiver 56 and the first communication network; the second Power Amplifier 59 is connected with the second Radio Frequency signal transceiver 57, to amplify the Radio Frequency interacted between the second Radio Frequency signal transceiver 57 and the second communication network.

When compared with an existing terminal, as shown in FIG. 4 and FIG. 5, the terminal constructed according to the embodiments of the invention still includes only one set of physical hardware resources (the ARM Core 51, the DSP 52 and the Data Buffer 53 shown in FIG. 5). However, with the virtualization of the hardware resource performed by the VMM 44, the VMM 44 may provide the RTOS 42 and the RTOS 43 with independent and isolated virtual hardware resources, respectively. Hence, the RTOS 42 and the RTOS 43 may be run in parallel on the Modem 451 based on the virtual hardware resources offered by the VMM 44. The virtual hardware resources mainly include virtual CPU, virtual DSP and virtual Buffer. The VMM 44 performs the virtualization of the hardware resources as follows.

The VMM 44 needs to perform virtualization of the CPU in the Modem 451, i.e., perform virtualization of the ARM Core 51. According to the embodiments of the disclosure, in the virtualization of the ARM Core 51, time division scheduling is performed on a hardware ability of the ARM Core 51 so that all RTOSs required to be run in parallel may share a memory, a hardware interrupt and time slices of the ARM Core 51. For example, in the terminal shown in FIG. 4, which includes two RTOSs, the time division scheduling may be performed on the ARM Core 51 based on a preset time division scheduling frequency. Durations of the time slices may be determined based on the time division scheduling frequency. In addition, the memory of the ARM Core 51 should be divided into two independent memory partitions, the two memory partitions are respectively allocated to the RTOS 42 and the RTOS 43 shown in FIG. 4. For convenient allocation of the memory partitions, according to the embodiments of the disclosure, different identifiers are respectively assigned for the two memory partitions, and bindings among the memory partitions, the memory identifiers and the RTOSs are recorded.

The VMM 44 further needs to perform virtualization of the DSP 52 as follows. In different time slices, network parameters corresponding to the different communication network standards are set for the DSP 52 based on the preset time division scheduling frequency and communication protocols run by the RTOSs supporting the different communication network standards; hence, the DSP 52 may run the communication protocols of the different communication network standards at different moments and corresponding data is encapsulated based on a currently running communication protocol. In this way, time division multiplexing of DSP 52, i.e., the virtualization of DSP 52 is implemented.

Figure 6:
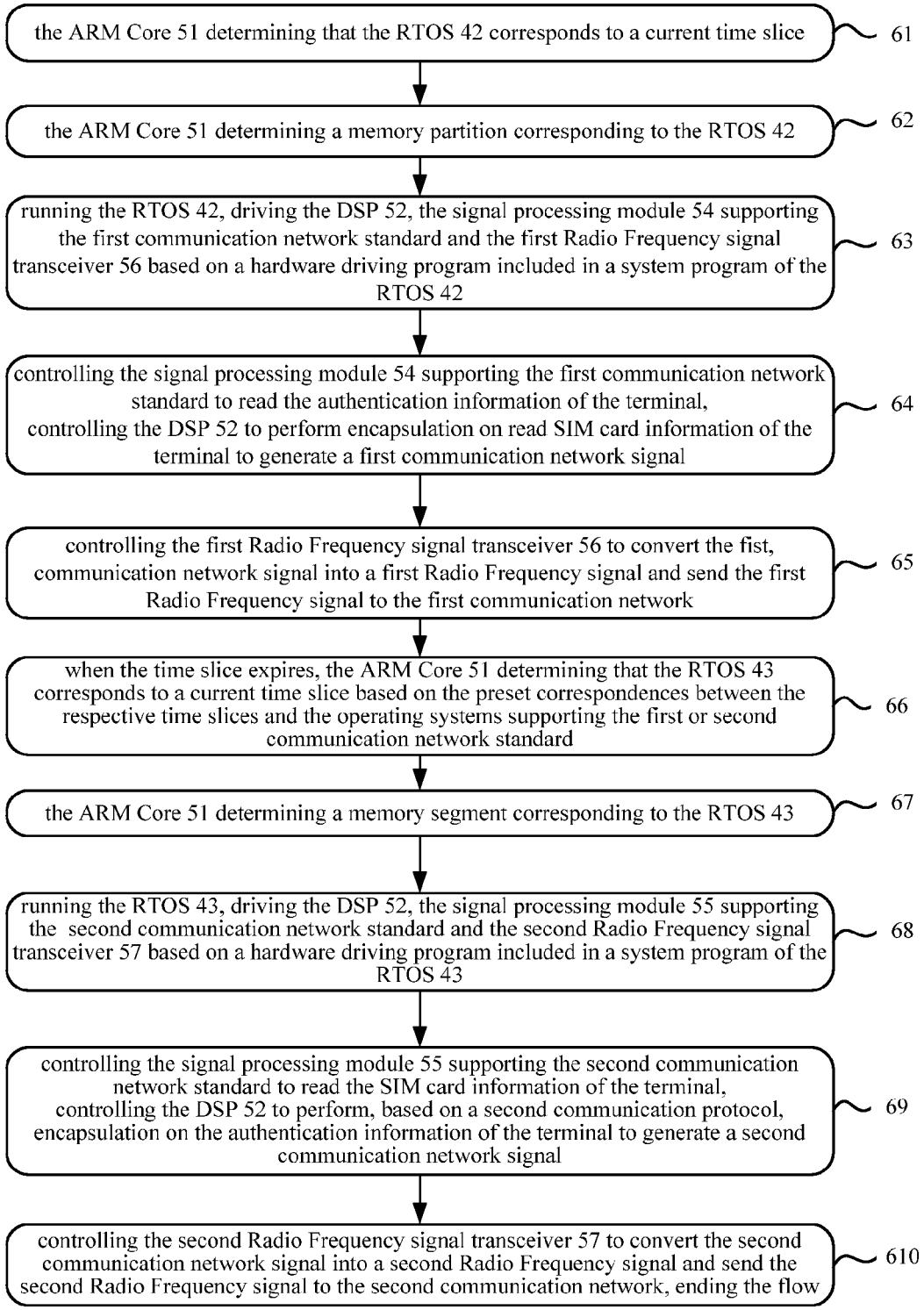
FIG. 6 is a schematic flow chart for establishing connections with different communication networks based on the structures illustrated in FIG. 4 and FIG. 5.

FIG. 6 is a schematic flow chart for establishing connections between the terminal and different communication networks based on the foregoing virtualization and the structure illustrated in FIG. 4 and FIG. 5. The flow includes the following steps.

In the step 61, the ARM Core 51 determines, based on preset correspondences between respective time slices and the operating systems supporting the first or second communication network standard, an operating system corresponding to a current time slice. For example, the ARM Core 51 determines that the operating system corresponding to the current time slice is the RTOS 42.

In the step 62, the ARM Core 51 determines, based on preset correspondences between the operating systems supporting the different communication network standards and the memory partitions in the memory of the terminal, a memory partition corresponding to the RTOS 42.

In the step 63, the ARM Core 51 runs the RTOS 42 based on the memory partition determined in the step 62, and the ARM Core 51 drives the DSP 52, the signal processing module 54 supporting the first communication network standard and the first Radio Frequency signal transceiver 56 based on a hardware driving program included in a system program of the RTOS 42.

Optionally, the ARM Core 51 may further drive the first Power Amplifier 58 and/or the Data Buffer 53, which may be implemented by changing the setting of the hardware driving program.

In the step 64, the ARM Core 51 controls the signal processing module 54 supporting the first communication network standard to read the authentication information of the terminal from the SIM card of the terminal. The ARM Core 51 also controls the DSP 52 to perform, based on a first communication protocol corresponding to the first communication network standard supported by the RTOS 42, encapsulation on the read authentication information of the terminal to generate a first communication network signal.

In the step 65, the ARM Core 51 controls the first Radio Frequency signal transceiver 56 to convert the first communication network signal into a first Radio Frequency signal and send the first Radio Frequency signal to the first communication network.

Optionally, if the first Power Amplifier 58 is further driven in the step 63, after the first Radio Frequency signal transceiver 56 converts the first communication network signal into the first Radio Frequency signal, the first Radio Frequency signal may be sent to the first Power Amplifier 58 to perform amplification, then the amplified signal is sent to the first communication network.

In the step 66, when the above described time slice expires, the ARM Core 51 determines, based on the preset correspondences between the respective time slices and the operating systems supporting the first or second communication network standard, an operating system corresponding to a current time slice. For example, the ARM Core 51 determines that the operating system corresponding to the current time slice is the RTOS 43.

In the step 67, the ARM Core 51 determines, based on the preset correspondences between the operating systems supporting the different communication network standards and the memory partitions in the memory of the terminal, a memory partition corresponding to the RTOS 43.

In the step 68, the ARM Core 51 runs the RTOS 43 based on the memory partition determined in the step 67, and the ARM Core 51 drives the DSP 52, the signal processing module 55 supporting the second communication network standard and the second Radio Frequency signal transceiver 57 based on a hardware driving program included in a system program of the RTOS 43.

Optionally, the ARM Core 51 may further drive the second Power Amplifier 59 and/or the Data Buffer 53.

In the step 69, the ARM Core 51 controls the signal processing module 55 supporting the second communication network standard to read the authentication information of the terminal from the SIM card of the terminal. The ARM Core 51 also controls the DSP 52 to perform, based on a second communication protocol corresponding to the second communication network standard supported by the RTOS 43, encapsulation on the read authentication information of the terminal to generate a second communication network signal.

In the step 610, the ARM Core 51 controls the second Radio Frequency signal transceiver 57 to convert the second communication network signal into a second Radio Frequency signal and send the second Radio Frequency signal to the second communication network. Here the flow is ended.

Optionally, if the second Power Amplifier 59 is further driven in the step 68, after the second Radio Frequency signal transceiver 57 converts the second communication network signal into the second Radio Frequency signal, the second Radio Frequency signal may be sent to the second Power Amplifier 59 to perform amplification, then the amplified signal is sent to the second communication network.

Figure 7:
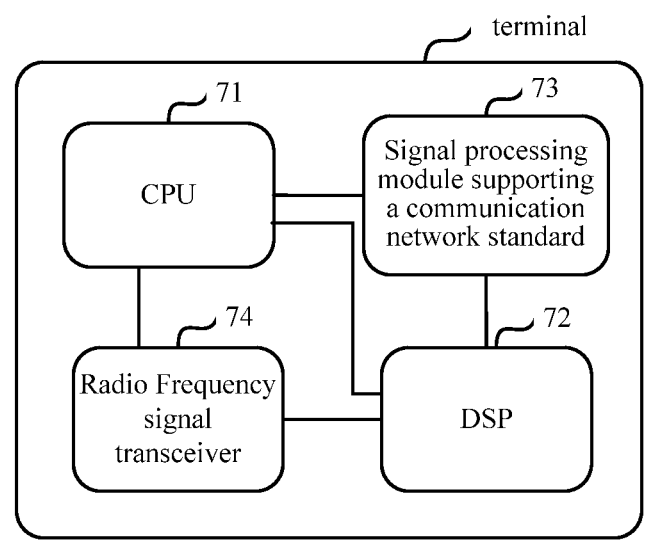
FIG. 7 is a schematic structure diagram of a terminal according to an embodiment of the disclosure.

A terminal is further provided according to an embodiment of the disclosure. A schematic structure diagram of the terminal is shown in FIG. 7. The terminal includes a CPU 71, a DSP 72, a signal processing module 73 supporting a communication network standard and a Radio Frequency signal transceiver 74. Functions of the components are described as follows.

The CPU 71 is configured to determine, based on preset correspondences between respective time slices and operating systems supporting different communication network standards, an operating system corresponding to a current time slice; determine, based on preset correspondences between the operating systems supporting different communication network standards and memory partitions in a memory of the terminal, a memory partition corresponding to the determined operating system; run the determined operating system based on the determined memory partition, drive the DSP 72, the signal processing module 73 supporting the communication network standard and the Radio Frequency signal transceiver 74 based on a hardware driving program included in a system program of the determined operating system, and control the DSP 72, the signal processing module 73 supporting the communication network standard and the Radio Frequency signal transceiver 74.

The signal processing module 73 supporting the communication network standard is configured to read, under control of the CPU 71, authentication information of the terminal.

The DSP 72 is configured to, under control of the CPU 71, encapsulate the authentication information read by the signal processing module 73 supporting the communication network standard based on a communication protocol corresponding to the determined operating system to obtain a communication network signal.

The Radio Frequency signal transceiver 74 is configured to, under control of the CPU 71, convert the communication network signal obtained by the DSP 72 into a Radio Frequency signal and send the Radio Frequency signal to the communication network.

A virtual machine program product is further provided according to an embodiment of the disclosure. The virtual machine program product includes instructions which are executable by a CPU and enables the CPU to perform the following operations:

determining, based on preset correspondences between respective time slices and operating systems supporting different communication network standards, an operating system corresponding to a current time slice, where the operating system supports a communication network standard;

determining, based on preset correspondences between the operating systems supporting different communication network standards and memory partitions in a memory of the terminal, a memory partition corresponding to the determined operating system;

running the determined operating system based on the determined memory partition and driving a corresponding DSP, a corresponding signal processing module supporting a communication network standard and a corresponding Radio Frequency signal transceiver based on a hardware driving program included in a system program of the determined operating system, where the signal processing module supports the communication network standard supported by the determined operating system;

controlling the signal processing module to read authentication information of the terminal and controlling the DSP to perform, based on a communication protocol corresponding to the communication network standard supported by the signal processing module, encapsulation on the read authentication information of the terminal to generate a communication network signal; and controlling the Radio Frequency signal transceiver to convert the communication network signal into a Radio Frequency signal and to send the Radio Frequency signal to a communication network.

The operating systems supporting the different communication network standards include an operating system supporting a communication network standard of GSM and an operating system supporting a communication network standard of TD-SCDMA.

The virtual machine program product further includes instructions which are executable by the CPU and enables the CPU to perform the following operations:

driving a corresponding data buffer based on the hardware driving program;

after the communication network signal is converted into the Radio Frequency signal by the Radio Frequency signal transceiver and the Radio Frequency signal is sent to the communication network, determining a storage space partition corresponding to the determined operating system based on preset correspondences between the operating systems supporting the different communication network standards and storage space partitions in a storage space of the data buffer; and storing the signal interacted between the terminal and the communication network may in the determined storage space partition.

The virtual machine program product further includes instructions which are executable by the CPU and enables the CPU to perform the following operations:

driving a corresponding power amplifier based on the hardware driving program;

where the instructions which are executable by the CPU and enables the CPU to control the Radio frequency signal transceiver to convert the communication network signal into the Radio Frequency signal and send the Radio Frequency signal to the communication network includes instructions executable by the CPU and enables the CPU to:

control the Radio Frequency signal transceiver to convert the communication network signal into the Radio Frequency signal by the Radio Frequency signal transceiver and send the Radio Frequency signal to the power amplifier, and control the power amplifier to amplify the Radio Frequency signal and send the amplified Radio Frequency signal to the communication network.

In addition, a modem is further provided according to an embodiment of the disclosure. The modem includes:

a CPU, configured to determine, based on preset correspondences between respective time slices and operating systems supporting different communication network standards, an operating system corresponding to a current time slice, where the determined operating system supports a communication network standard; determine, based on preset correspondences between the operating systems supporting different communication network standards and memory partitions in a memory of the terminal, a memory partition corresponding to the determined operating system; run the determined operating system based on the determined memory partition, drive a corresponding DSP, a corresponding signal processing module supporting a communication network standard and a corresponding Radio Frequency signal transceiver based on a hardware driving program included in a system program of the determined operating system, control the DSP and the signal processing module supporting the communication network standard, and control the Radio Frequency signal transceiver to convert a communication network signal into a Radio Frequency signal and send the Radio Frequency signal to the communication network;

the signal processing module supporting the communication network standard, configured to read, under control of the CPU, authentication information of the terminal; and the DSP, configured to, under control of the CPU, encapsulate the authentication information based on a communication protocol corresponding to the communication network standard to obtain the communication network signal.

The operating systems supporting the different communication network standards include an operating system supporting a communication network standard of GSM and an operating system supporting a communication network standard of TD-SCDMA.

The CPU is further configured to drive a corresponding data buffer based on the hardware driving program; after the communication network signal is converted into the Radio Frequency signal by the Radio Frequency signal transceiver and the Radio Frequency signal is sent to the communication network, determine a storage space partition corresponding to the determined operating system based on preset correspondences between the operating systems supporting the different communication network standards and storage space partitions in a storage space of the data buffer; and store the signal interacted between the terminal and the communication network in the determined storage space partition;

The modem further includes:

the data buffer, configured to buffer the signal interacted between the communication network and the terminal.

The CPU is further configured to drive a corresponding power amplifier based on the hardware driving program; for controlling the Radio frequency signal transceiver to convert the communication network signal into the Radio Frequency signal and send the Radio Frequency signal to the communication network, control the Radio Frequency signal transceiver to convert the communication network signal into the Radio Frequency signal and send the Radio Frequency signal to the power amplifier, and control the power amplifier to amplify the Radio Frequency signal and send the amplified Radio Frequency signal to the communication network.

The CPU in the modem may be implemented with an ARM Core.

Apparently, alterations and variations may be made based on the disclosure by those skilled in the art without departing from the spirit and scope of the disclosure. The disclosure intends to protect the alterations and variations which are within the scope of the claims of the disclosure and the equivalents thereof.

The invention claimed is:

1. A method for implementing communication, comprising:

determining, based on preset correspondences between respective time slices and operating systems supporting different communication network standards, an operating system corresponding to a current time slice, wherein the determined operating system supports a communication network standard;

determining, based on preset correspondences between the operating systems supporting the different communication network standards and memory partitions in a memory of a terminal, a memory partition corresponding to the determined operating system;

running the determined operating system based on the determined memory partition and driving a corresponding Digital Signal Processor, a corresponding signal processing module supporting a communication network standard and a corresponding Radio Frequency signal transceiver based on a hardware driving program comprised in a system program of the determined operating system, wherein the signal processing module supports the communication network standard supported by the determined operating system;

controlling the signal processing module to read authentication information of the terminal and controlling the Digital Signal Processor to perform, based on a communication protocol corresponding to the communication network standard, encapsulation on the authentication information of the terminal to generate a communication network signal; and controlling the Radio Frequency signal transceiver to convert the communication network signal into a Radio Frequency signal and send the Radio Frequency signal to a communication network.

2. The method according to claim 1, wherein the operating systems supporting the different communication network standards comprise:

an operating system supporting a communication network standard of Global System for Mobile Communications and an operating system supporting a communication network standard of Time Division-Synchronous Code Division Multiple Access.

3. The method according to claim 1, wherein the method further comprises:

driving a corresponding data buffer based on the hardware driving program;

wherein after controlling the Radio Frequency signal transceiver to convert the communication network signal into the Radio Frequency signal and send the Radio Frequency signal to the communication network, the method further comprises:

determining, based on preset correspondences between the operating systems supporting the different communication network standards and storage space partitions in a storage space of the data buffer, a storage space partition corresponding to the determined operating system; and storing the signal interacted between the terminal and the communication network in the determined storage space partition.

4. The method according to claim 1, wherein the method further comprises:

driving a corresponding power amplifier based on the hardware driving program;

wherein the controlling the Radio Frequency signal transceiver to convert the communication network signal into the Radio Frequency signal and send the Radio Frequency signal to the communication network comprises:

controlling the Radio Frequency signal transceiver to convert the communication network signal into the Radio Frequency signal and send the Radio Frequency signal to the power amplifier, and controlling the power amplifier to amplify the Radio Frequency signal and send the amplified signal to the communication network.

5. A virtual machine program product comprising instructions which are executable by a Central Processing Unit and enables the Central Processing Unit to perform the following operations:
   determining, based on preset correspondences between respective time slices and operating systems supporting different communication network standards, an operating system corresponding to a current time slice, wherein the determined operating system supports a communication network standard;
   determining, based on preset correspondences between the operating systems supporting the different communication network standards and memory partitions in a memory of a terminal, a memory partition corresponding to the determined operating system;
   running the determined operating system based on the determined memory partition and driving a corresponding Digital Signal Processor, a corresponding signal processing module supporting a communication network standard and a corresponding Radio Frequency signal transceiver based on a hardware driving program comprised in a system program of the determined operating system, wherein the signal processing module supports the communication network standard supported by the determined operating system;
   controlling the signal processing module to read authentication information of the terminal and controlling the Digital Signal Processor to perform, based on a communication protocol corresponding to the communication network standard supported by the signal processing module, encapsulation on the authentication information of the terminal to generate a communication network signal; and
   controlling the Radio Frequency signal transceiver to convert the communication network signal into a Radio Frequency signal and send the Radio Frequency signal to a communication network.

6. The virtual machine program product according to claim 5, wherein the operating systems supporting the different communication network standards comprise:
   an operating system supporting a communication network standard of Global System for Mobile Communications and an operating system supporting a communication network standard of Time Division-Synchronous Code Division Multiple Access.

7. The virtual machine program product according to claim 5, wherein the virtual machine program product further comprises instructions which are executable by the Central Processing Unit and enables the Central Processing Unit to perform the following operations:
   driving a corresponding data buffer based on the hardware driving program;
   after controlling the Radio Frequency signal transceiver to convert the communication network signal into the Radio Frequency signal and send the Radio Frequency signal to the communication network, determining, based on preset correspondences between the operating systems supporting the different communication network standards and storage space partitions in a storage space of the data buffer, a storage space partition corresponding to the determined operating system; and
   storing the signal interacted between the terminal and the communication network in the determined storage space partition.

8. The virtual machine program product according to claim 5, wherein the virtual machine program product further comprises instructions which are executable by the Central Processing Unit and enables the Central Processing Unit to perform the following operations:
   driving a corresponding power amplifier based on the hardware driving program;
   wherein the instructions which are executable by the Central Processing Unit and enables the Central Processing Unit to control the Radio frequency signal transceiver to convert the communication network signal into the Radio Frequency signal and send the Radio Frequency signal to the communication network comprise instructions executable by the Central Processing Unit and enabling the Central Processing Unit to:
   control the Radio Frequency signal transceiver to convert the communication network signal into the Radio Frequency signal and send the Radio Frequency signal to the power amplifier, and control the power amplifier to amplify the Radio Frequency signal and send the amplified signal to the communication network.

9. A modem, comprising:
   a Central Processing Unit, configured to determine, based on preset correspondences between respective time slices and operating systems supporting different communication network standards, an operating system corresponding to a current time slice, wherein the determined operating system supports a communication network standard; determine, based on preset correspondences between the operating systems supporting the different communication network standards and memory partitions in a memory of a terminal, a memory partition corresponding to the determined operating system; run the determined operating system based on the determined memory partition, drive a corresponding Digital Signal Processor, a corresponding signal processing module supporting the communication network standard and a corresponding Radio Frequency signal transceiver based on a hardware driving program comprised in a system program of the determined operating system, control the Digital Signal Processor and the signal processing module supporting the communication network standard, and control the Radio Frequency signal transceiver to convert a communication network signal into a Radio Frequency signal and send the Radio Frequency signal to a communication network;
   the signal processing module supporting the communication network standard, configured to read, under control of the Central Processing Unit, authentication information of the terminal; and
   the Digital Signal Processor, configured to, under control of the Central Processing Unit, perform encapsulation, based on a communication protocol corresponding to the communication network standard, on the authentication information of the terminal to obtain the communication network signal.

10. The modem according to claim 9, wherein the operating systems supporting the different communication network standards comprise:
   an operating system supporting a communication network standard of Global System for Mobile Communications and an operating system supporting a communication network standard of Time Division-Synchronous Code Division Multiple Access.

11. The modem according to claim 9, wherein the Central Processing Unit is further configured to drive a corresponding data buffer based on the hardware driving program; after controlling the Radio Frequency signal transceiver to convert the communication network signal into the Radio Frequency signal and send the Radio Frequency signal to the communication network, determine a storage space partition corresponding to the determined operating system based on preset correspondences between the operating systems supporting the different communication network standards and storage space partitions in a storage space of the data buffer; and store the signal interacted between the terminal and the communication network in the determined storage space partition;

wherein the modem further comprises:

the data buffer, configured to buffer the signal interacted between the communication network and the terminal.

12. The modem according to claim 9, wherein the Central Processing Unit is further configured to drive a corresponding power amplifier based on the hardware driving program; for controlling the Radio frequency signal transceiver to convert the communication network signal into the Radio Frequency signal and send the Radio Frequency signal to the communication network, control the Radio Frequency signal transceiver to convert the communication network signal into the Radio Frequency signal and send the Radio Frequency signal to the power amplifier, and control the power amplifier to amplify the Radio Frequency signal and send the amplified signal to the communication network.

13. A terminal, comprising the modem according to claim 9 and the Radio Frequency signal transceiver, wherein the Radio Frequency signal transceiver is configured to, under control of the Central Processing Unit, convert the communication network signal into the Radio Frequency signal and send the Radio Frequency signal to the communication network.

* * * * *